United States Patent [19]
Comte et al.

[11] Patent Number: 5,677,932
[45] Date of Patent: Oct. 14, 1997

[54] BASEBAND ESTIMATOR FOR ESTIMATING THE AMPLITUDE/FREQUENCY CHARACTERISTIC OF A MULTIPHASE SIGNAL

[75] Inventors: Michel Comte, Franconville; Gérard Lample, Rosny Sous Bois, both of France

[73] Assignee: Alcatel Telspace, Nanterre Cedex, France

[21] Appl. No.: 362,169

[22] Filed: Dec. 22, 1994

[30]  Foreign Application Priority Data

Dec. 30, 1993 [FR] France .................................. 93 15906

[51] Int. Cl.$^6$ .................................................. H03H 7/30
[52] U.S. Cl. .................... 375/235; 375/266; 375/345; 375/350; 364/724.16; 364/724.2
[58] Field of Search .......................... 375/229, 230, 375/232, 235, 266, 316, 322, 324, 326, 327, 344, 345, 346, 350; 364/724.01, 724.16, 724.2

[56]  References Cited

U.S. PATENT DOCUMENTS

| | | | |
|---|---|---|---|
| 4,020,333 | 4/1977 | Nussbaumer | 375/235 |
| 4,638,495 | 1/1987 | Mizoguchi | 375/235 |
| 4,985,900 | 1/1991 | Rhind et al. | 375/224 |
| 5,533,050 | 7/1996 | Isard et al. | 375/229 |

OTHER PUBLICATIONS

Chamberlain et al., "Receiver Technique for Microwave Digital Radio", *IEEE Communications Magazine*, vol. 24, No. 11, Nov. 1986, pp. 43–53.

Davyrian "Mobile Digital Communications", *IEEE Transactions on Vehicular Technology*, vol. VT–36, No. 2, Mayy 1987, pp. 55–62.

French Search Report FR 9315906.

*Primary Examiner*—Stephen Chin
*Assistant Examiner*—Amanda T. Le
*Attorney, Agent, or Firm*—Sughrue, Mion, Zinn, Macpeak & Seas, PLLC

[57]   ABSTRACT

An estimator for estimating the amplitude/frequency characteristic of a source signal from which baseband components $\underline{i}$ and $\underline{q}$ which are applied to the inputs of said estimator are derived by demodulation using two signals having orthogonal phases. The estimator includes a combiner for generating complex components $\underline{i}+j\cdot\underline{q}$ and $\underline{q}+j\cdot\underline{i}$ from the components $\underline{i}$ and $\underline{q}$ and evaluates the relative amplitudes of the complex components in order to produce a coefficient representative of the amplitude/frequency characteristic of the source signal. The invention can be used to implement a frequency equalizer whose estimator operates in the baseband, the estimator possibly driving a transversal filter operating at the intermediate frequency or at the microwave frequency.

10 Claims, 5 Drawing Sheets

TRANSVERSAL FILTER

BASEBAND ESTIMATOR FOR ESTIMATING THE AMPLITUDE/FREQUENCY CHARACTERISTIC OF A MULTIPHASE SIGNAL

BACKGROUND OF THE INVENTION

1. Field of the Invention

The field of the invention is that of microwave digital signal transmission systems.

The invention is more particularly concerned with a device for estimating the amplitude/frequency characteristic of a source signal from which baseband components $i$ and $q$ which are applied to the inputs of the estimator are obtained by demodulation using two signals with orthogonal phases. An estimator of this kind can be used, for example, in a frequency equalizer of a microwave signal receiver for receiving modulated signals with modulation of the following types: M-PSK (phase shift keying with M phase states) or M-QAM (quadrative amplitude modulation with M phase states).

2. Description of the Prior Art

One problem with digital microwave transmission systems is that the signal picked up by a receiver may suffer from the effects of multipath propagation. The spectrum of the received signal shows selective fading and this results in intersymbol interference in the digital signal. The spectrum transmitted is symmetrical about the carrier. Deformation of the spectrum may produce a form of deformation usually called "tilt". A spectrum has a tilt if the amplitude of the received signal is different below and above the carrier (or intermediate) frequency. This deformation of the spectrum is usually symmetrical about the carrier (or intermediate) frequency. It happens if selective fading occurs at the edge of the spectrum.

The deformed spectrum received must therefore be returned to its original symmetrical shape using an adaptive frequency equalizer. The function of a frequency equalizer is therefore to modify the spectrum of a received signal to compensate the effects of multipath propagation.

An adaptive frequency equalizer conventionally includes a transversal filter receiving an input signal and supplying a corrected output signal to a device for estimating the amplitude/frequency characteristic of this output signal. The estimator drives the transversal filter in order to correct this characteristic.

Most prior art frequency equalizers operate at the intermediate frequency. A frequency equalizer of this type is shown in the FIG. 1 demodulator stage.

An intermediate frequency signal FI is applied to the input of a transversal filter 1 whose output is an intermediate frequency signal $\widetilde{FI}$ with a corrected amplitude/frequency characteristic. This signal $\widetilde{FI}$ is applied to two narrowband filters 2, 3 with respective center frequencies $\underline{f1}$ and $\underline{f2}$ in the spectrum of the signal FI (see FIG. 2). FIG. 2 shows the spectrum of the signal $\widetilde{FI}$ affected by tilt. The frequencies $\underline{f1}$ and $\underline{f2}$ are on opposite sides of the frequency $\underline{f0}$ which is the center frequency of the signal $\widetilde{FI}$.

The amplitudes of the output signals of the filters 2 and 3 allow for the deformation of the spectrum and it is therefore possible to drive the transversal filter 1 in such a way that the amplitudes of its output signals are substantially identical about the frequency $\underline{fo}$. The filter 1 is controlled by a processor 4 which generates correction coefficients applied to the filter 1. The filter 1, the narrowband filters 2 and 3 and the processor 4 constitute a frequency equalizer operating at the intermediate frequency.

FIG. 3 is the block diagram of a conventional transversal filter 1. This filter includes two delay lines of duration T, three multipliers receiving correction coefficients $\underline{a}-1$, $\underline{a}0$ and $\underline{a}+1$ and an adder whose output signal is the corrected signal $\widetilde{FI}$. The time-delays T depend on the center frequency $\underline{fo}$ of the modulated signal FI and on the symbol signalling rate.

This corrects for the amplitude/frequency response of the propagation medium and the corrected spectrum is flat in the wanted band, i.e. free of any tilt.

The corrected signal from the filter 1 (FIG. 1) is applied to two mixers 5, 6 receiving two signals with orthogonal phases from a local oscillator 7 operating at the intermediate frequency. The mixers 5 and 6 are followed by amplifiers 8, 9 producing two corrected and amplified baseband demodulation components $\tilde{I}$ and $\tilde{Q}$.

The prior art direct demodulation digital signal receivers use a local oscillator whose output signal frequency is equal to the carrier frequency of the received signal. In this case the signal FI in FIG. 1 is replaced by a microwave signal SHF and the local oscillator 8 supplies a signal at a frequency equal to the carrier frequency.

However, microwave frequency equalizers have the drawback of being complex and costly. For this reason it is preferable to use frequency equalizers which operate at the intermediate frequency. In this case it is not possible to employ direct demodulation of the received signal to recover two baseband components directly if it is also necessary to correct the amplitude/frequency characteristic of the received signal.

Implementing a frequency equalizer operating in the baseband, i.e. after demodulation, raises a problem described below with reference to FIGS. 4A and 4B.

FIG. 4A shows the observable spectrum of a received signal deformed by tilt. The center frequency $\underline{f0}$ corresponds to the carrier frequency or to the intermediate frequency. FIG. 4B shows the usable spectrum of this signal after demodulation. The resultant usable spectrum is shown in dashed line. It is the result of summing negative spectral components 100 corresponding to frequencies below $\underline{f0}$ and positive spectral components 200 above frequency $\underline{f0}$.

The resultant spectrum is observable on each of the demodulated signal paths and because of this aliasing the tilt is no longer detectable. Any difference in amplitude between the frequencies above and below the center frequency is therefore imperceptible. There is no known estimator operating in the baseband able to drive a transversal filter which corrects the amplitude/frequency characteristic of a received signal.

An object of the present invention is to provide an estimator operating in the baseband for estimating the amplitude/frequency characteristic of a source signal at the intermediate frequency or at a microwave frequency from which baseband components which are fed to the estimator are derived by demodulation using two signals with orthogonal phases. An estimator of this kind must be able to detect a difference in amplitude between frequencies above and below the carrier (or intermediate) frequency eliminated by demodulation, i.e. it must be capable of providing a coefficient representative of the amplitude/frequency characteristic of the source signal. This coefficient can be used to drive a transversal filter so that it functions as a tilt corrector (or slope equalizer) for the signal applied to the filter.

The tilt correction coefficient generated by the baseband estimator can be applied to a transversal filter receiving as its input signal a baseband signal (including a signal obtained by direct demodulation), an intermediate frequency signal or a microwave signal (see below).

A further object of the invention is to provide a baseband estimator of this kind also supplying a gain control coefficient to amplifiers. A gain control coefficient of this kind can be applied to the amplifiers usually provided between the demodulator stage and the transversal filter or directly at the transversal filter.

SUMMARY OF THE INVENTION

These objects, and others that will emerge hereinafter, are achieved by an estimator for estimating the amplitude/frequency characteristic of a source signal from which baseband components $i$ and $q$ which are applied to the inputs of said estimator are derived by demodulation using two signals having orthogonal phases said estimator including combining means for generating complex components $i+j \cdot q$ and $q+j \cdot i$ from the components $i$ and $q$ and means for evaluating the relative amplitudes of said complex components in order to produce a coefficient representative of said amplitude/frequency characteristic of said source signal.

Obtaining $i+j \cdot q$ and $q+j \cdot i$ corresponds to reconstituting positive and negative frequencies of the spectrum after demodulation and it is therefore possible to measure the amplitudes of these frequencies at a distance from the null frequency without going outside the baseband.

The means for combining the components $i$ and $q$ advantageously supply the complex components $i+j \cdot q$ and $q+j \cdot i$ to bandpass filters whose center frequencies are equal to a given frequency in the baseband.

These combining means are preferably two couplers with two 0°–90° input ports each summing at one output one baseband component and the other baseband component after it is phase-shifted 90° at the given frequency.

In an advantageous embodiment of the invention the components $i$ and $q$ are the two demodulation components (usually denoted I and Q) obtained by demodulating the source signal using two signals with orthogonal phases.

If the estimator of the invention is used to drive a transversal filter, the aforementioned coefficient constitutes a coefficient for correction of the amplitude/frequency characteristic of a signal applied to the input of the transversal filter, to which the correction coefficient is also applied. The output signal of the transversal filter is then a corrected signal.

This corrected signal can be a corrected microwave signal or a corrected intermediate frequency signal and in the latter case a demodulator stage inserted between the transversal filter and the estimator demodulates the corrected signal using two signals with orthogonal phases.

In a different embodiment of the invention the corrected signal is a baseband signal made up of two corrected demodulation components and the signal applied to the input of the transversal filter is made up of two baseband components from a demodulator stage receiving the source signal.

The estimator of the invention can include means for summing $|i+j \cdot q|$ and $|q+j \cdot i|$ supplying, after integration, a gain correction coefficient. This coefficient can be applied to amplifiers or to the transversal filter.

In another aspect the invention consists in a transversal filter controlled by an estimator of the above kind. This transversal filter includes:

first and second filter circuits each receiving one of said demodulation components and supplying respective first and second sum signals;

summing means for summing said second sum signal with a delayed first demodulation signal from said first filter circuit, said second sum signal having two components symmetrical in time about said first delayed demodulation signal;

subtractor means for subtracting said first sum signal from a second delayed demodulation signal from said second filter circuit, said first sum signal having two components symmetrical in time about said second delayed demodulation signal.

In a preferred application of the invention, the signal applied to the input of the transversal filter is made up of two baseband signals obtained by direct demodulation using two signals with orthogonal phases at a frequency equal to the carrier frequency of a received microwave signal constituting the source signal.

Other features and advantages of the invention will emerge from a reading of the following description of one embodiment of the estimator and of various applications thereof, given by way of non-limiting illustrative example with reference to the appended drawings.

DETAILED DESCRIPTION OF THE PREFERRED EMBODIMENT

Figure 5:
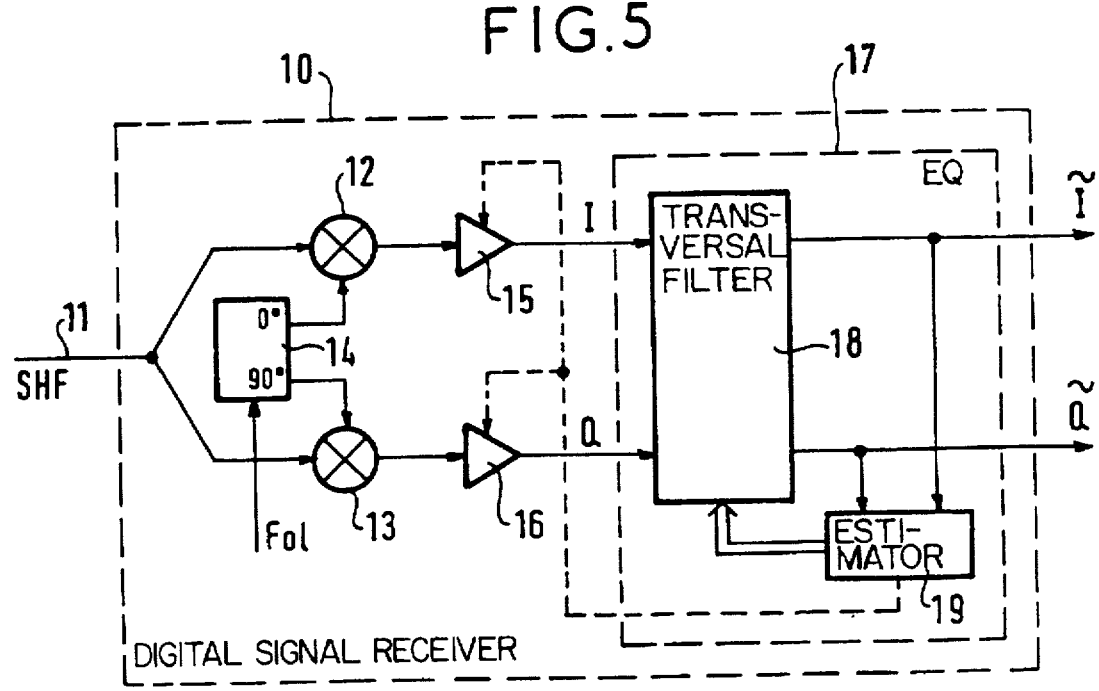
FIG. 5 is a block diagram of a demodulator stage of a digital signal receiver using direct demodulation and including a baseband frequency equalizer of the invention.

FIG. 5 is a block diagram of a demodulator stage of a digital signal receiver 10 using direct demodulation.

A microwave source signal SHF conveyed on a link 11 is applied to two mixers 12, 13 also receiving two signals in phase quadrature from a 90° phase-shifter 14. The phase-shifter 14 receives a local oscillator signal Fol whose frequency is equal to the carrier frequency of the microwave signal SHF, possibly obtained by carrier recovery. The output signals of the mixers 12 and 13 are therefore baseband signals and are applied to automatic gain control amplifiers 15, 16. The gain control is shown in dashed line and can be obtained directly by means of the estimator of the invention, as explained below.

The output signals of the amplifiers 15, 16 constitute the two baseband demodulation components I and Q obtained by demodulating the source signal SHF on two carriers in quadrature. The signals I and Q are applied to a baseband adaptive frequency equalizer 17. The frequency equalizer 17 includes a transversal filter 18 supplying two corrected baseband demodulation components Ĩ and Q̃ constituting the corrected output signal. These components are applied to an estimator 19 of the invention which drives the transversal filter 18.

The signal SHF could equally well be replaced by an intermediate frequency signal in which case Fol is equal to the intermediate frequency.

Figure 6:
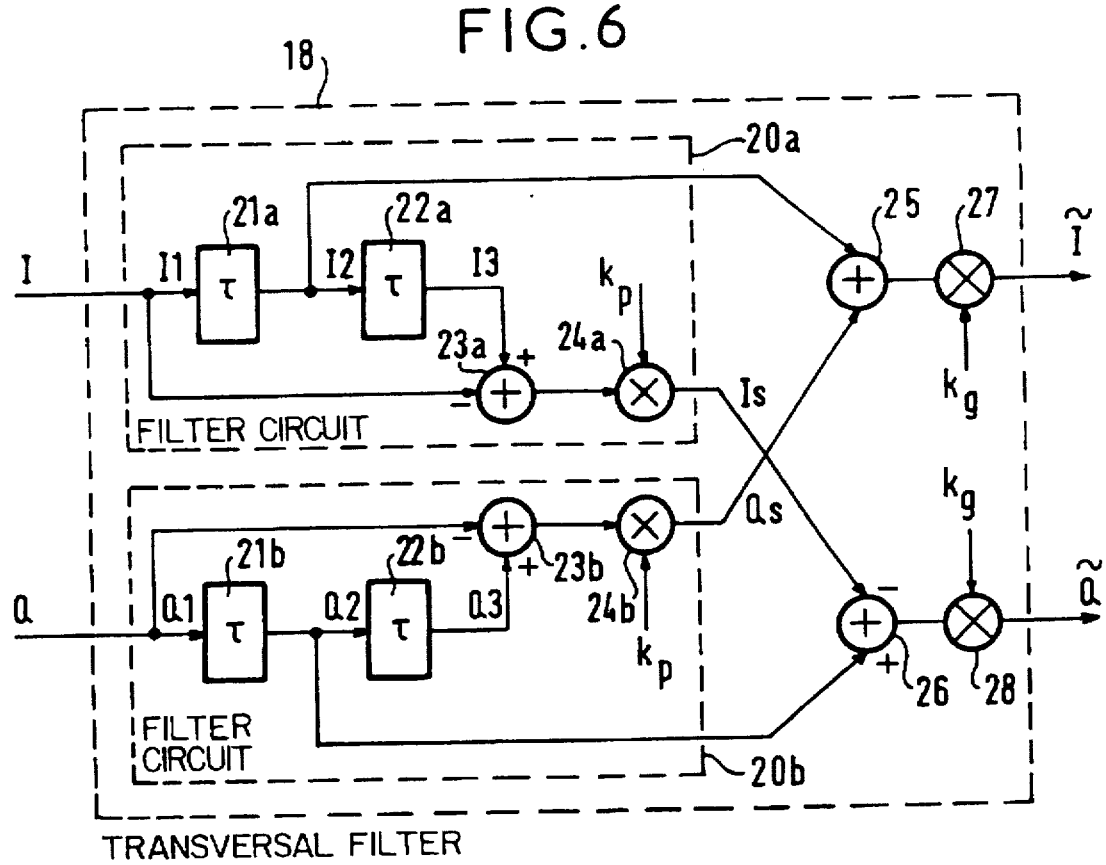
FIG. 6 shows a preferred embodiment of the transversal filter from FIG. 5.

FIG. 6 shows a preferred embodiment of the transversal filter 18. This filter is designed to correct a tilt, i.e. a difference in amplitude of frequencies below and above the carrier frequency. The signal applied to the input of the transversal filter 18 is usually made up of the two demodulation components I, Q obtained by demodulating an intermediate frequency or microwave source signal using two signals with orthogonal phases.

The transversal filter 18 includes identical first and second filter circuits 20a, 20b. Each circuit receives one of the demodulation components I, Q and supplies a respective first or second sum signal Is, Qs.

Each filter circuit 20a, 20b includes a first time-delay circuit 21a, 21b receiving a respective demodulation component I, Q and supplying a respective first or second delayed demodulation signal I2, Q2. A second time-delay circuit 22a, 22b at the output of the first time-delay circuit of each filter circuit supplies delayed signals I3 and Q3. Each time-delay circuit 21a, 21b, 22a and 22b delays the signal applied to its input by a time τ which can be chosen independently of the center frequency of the modulated signal and the symbol time.

Subtractors 23a and 23b subtract the input signals I1 and Q1 from the signals I3 and Q3, respectively. Multipliers 24a and 24b multiply the output signals of the subtractors 23a, 23b by a coefficient $k_p$. This coefficient is referred to hereinafter as the tilt correction coefficient and is supplied by the estimator 19. Multiplication produces the first and second sum signals Is and Qs.

We have:

Is=$k_p$·(I3–I1) where I1 is the signal applied to the input of the filter circuit 20a, I3 is the signal I1 delayed by 2τ, and $k_p$ is the tilt correction coefficient, and Qs=$k_p$·(Q3–Q1) where Q1 is the signal applied to the input of the filter circuit 20b and Q3 is the signal Q1 delayed by 2τ.

Summing means 25 sum the second sum signal Qs and the signal I2 which is referred to as the first delayed demodulation signal. The second sum signal Qs has two components symmetrical in time about the first delayed demodulation signal I2 since it allows for the signals Q1 and Q3.

Subtractor means 26 subtract from the first sum signal Is the signal Q2 which is referred to hereinafter as the second delayed demodulation signal. The first sum signal Is also has two components symmetrical in time about the second delayed demodulation signal Q2.

The output signals of the summing means 25 and the subtraction means 26 respectively constitute the corrected demodulation components Ĩ and Q̃.

The transfer function H(jω) of the filter circuits 20a, 20b is entirely real (ignoring the time-delay $e^{-j\omega\tau}$) and linear in phase. It is therefore free of group delay distortion (symmetrical impulse response).

Because of intersymbol distortion due to multipath propagation, Is has a component due to Q and Qs has a component due to I.

The corrected demodulation components Ĩ and Q̃ are applied to a decision unit (not shown) operating at the symbol frequency to restore the symbols transmitted. Thus the frequency equalizer operates before the decision stage.

The components Ĩ and Q̃ are applied to the estimator 19 (FIG. 5) driving the transversal filter 18.

Figure 7:
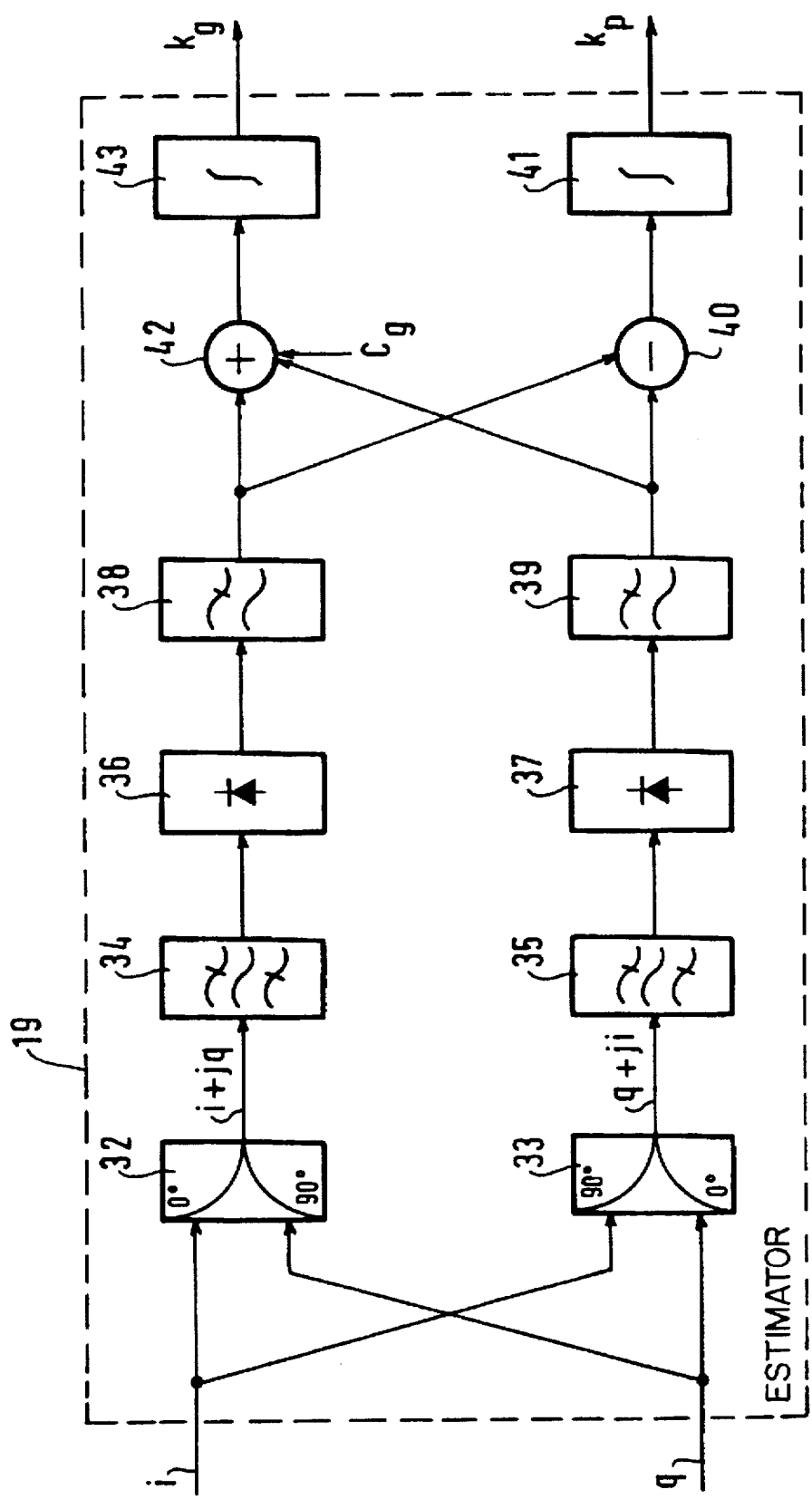
FIG. 7 shows a preferred embodiment of the estimator of the invention.

FIG. 7 shows a preferred embodiment of the estimator.

The estimator 19 shown is entirely analog. As in the prior art, its function is to estimate the amplitude/frequency characteristic of a source signal. Components I and Q are obtained by demodulating the source signal using two signals with orthogonal phases and these components are applied to the inputs of the estimator. The estimator includes a processor which generates a coefficient $k_p$ representative of the amplitude/frequency characteristic of the source signal.

The following notation is used in the remainder of this description: the signals applied to the inputs of the estimator are baseband components i and q which respectively correspond either to the uncorrected demodulation components I and Q or to the corrected demodulation components Ĩ and Q̃ if the estimator of the invention is used to drive a transversal filter.

In accordance with the invention, the signal applied to the input of the estimator is therefore made up of two components i and q obtained by demodulating a source signal using two signals with orthogonal phases. The processor shown generates the coefficient $k_p$ equal to the difference between |i+j·q| and |q+j·i|.

Figure 1:
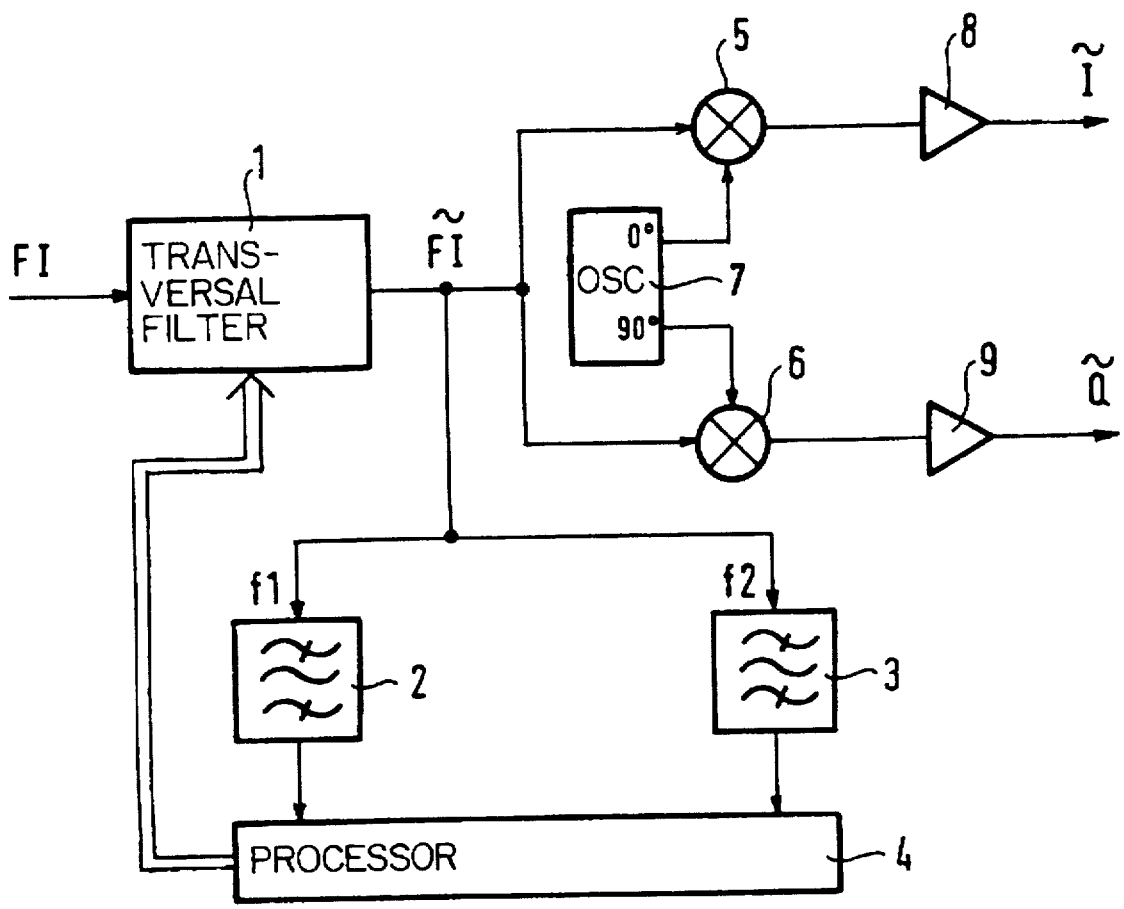
FIG. 1 shows a prior art demodulator stage including a frequency equalizer operating at the intermediate frequency or at a microwave frequency.
Figure 2:
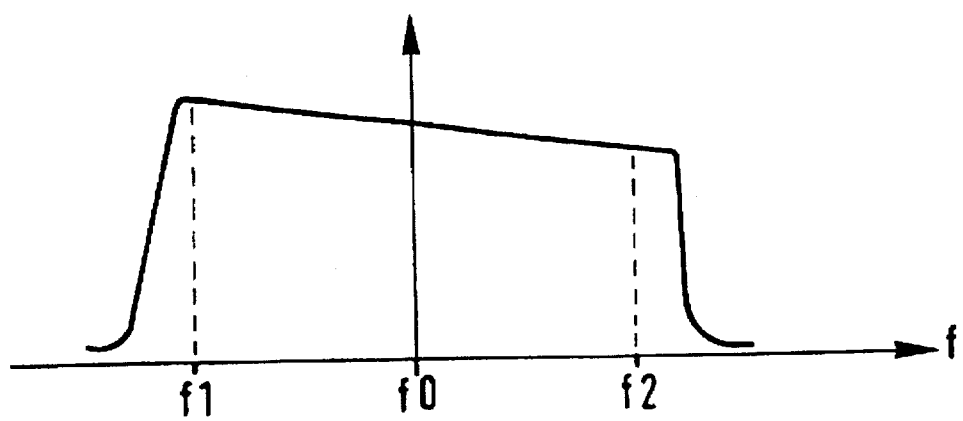
FIG. 2 shows the spectrum of a signal deformed by a tilt.
Figure 3:
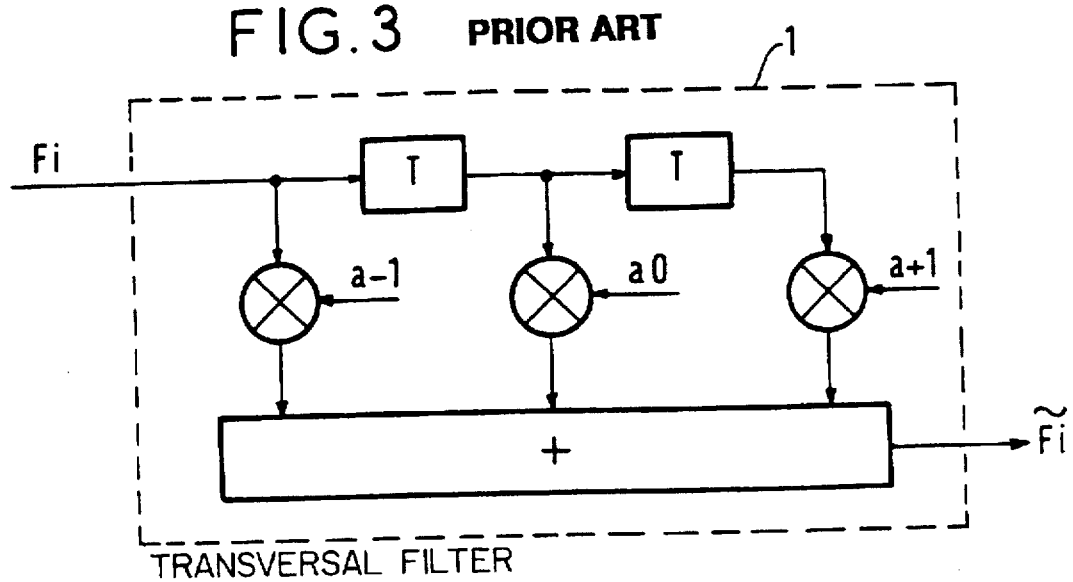
FIG. 3 is a block diagram of a prior art transversal filter which can be used to implement the frequency equalizer from FIG. 1.
Figure 4A:
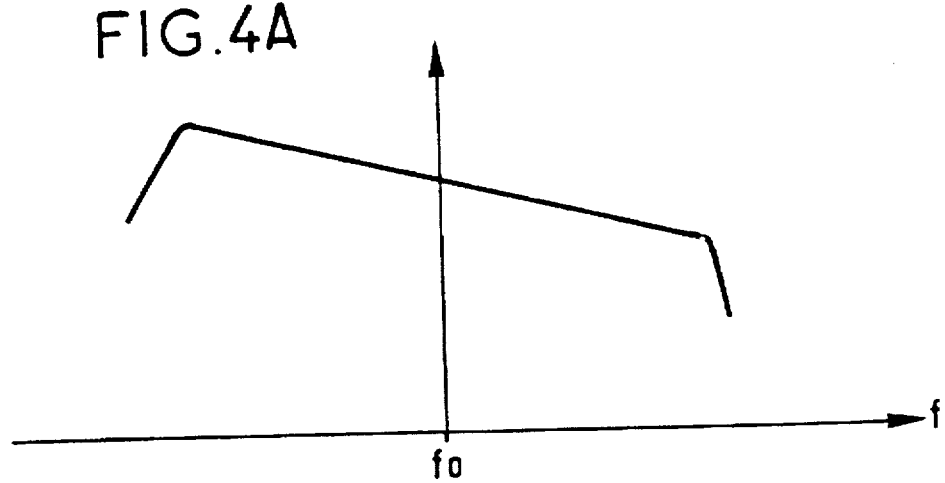
FIGS. 4A and 4B respectively show a spectrum deformed by a tilt before and after baseband demodulation.
Figure 4B:
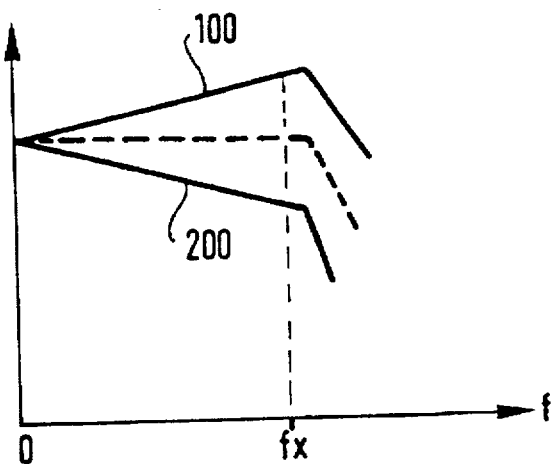

The estimator has two inputs to which the baseband components i and q are applied, each component being applied to two combining means 32 and 33. The combining means 32 and 33 respectively supply i+j·q and q+j·i and comprise two 0°–90° couplers with two input ports, for example. They introduce into one of the baseband components a phase-shift of 90° relative to the other baseband component at a given frequency in the baseband. This other component is summed with the phase-shifted component. This given frequency fx is as far as possible from the null frequency and is shown in FIG. 4B. For a real baseband of 20 MHz, fx is chosen equal to 10 MHz to obtain the maximal sensitivity, for example.

The combining means are provided to phase-shift one of the components at this given frequency by 90°. It is possible to use filter circuits such as LC circuits introducing a phase-shift of 90° at the chosen frequency or (preferably) commercially available hybrid 0°–90° couplers which offer a constant phase-shift over a wider range of frequencies.

The combining means in FIG. 7 are 0°–90° couplers. The component i is applied to the 0° input of the coupler 32, the 90° input of this coupler receiving the component q. Likewise, the component q is applied to the 0° input of the coupler 33, the 90° input of this coupler receiving the component i. The couplers 32 and 33 accordingly supply on their respective outputs complex components i+j·q and q+j·i derived from the components i and q applied to their inputs. This generates signals at the outputs of the couplers 32 and 33 which are representative of frequencies above and below the initial center frequency eliminated by the demodulation process. This restores the positive and negative frequencies of the spectrum (with respect to the center frequency).

The complex components are applied to bandpass filters 34, 35 the center frequencies of which are preferably the same and equal to the frequency fx. The estimator also includes means 36 through 40 for evaluating the relative amplitudes of the complex components i+j·q and q+j·i in order to produce the coefficient $k_p$ representative of the amplitude/frequency characteristic of the source signal.

These means include, for example, two energy detectors 36, 37 followed by lowpass filters 38, 39 from which are obtained |i+j·q| and |q+j·i|. A subtractor 40 supplies the difference between |i+j·q| and |q+j·i|. This difference is representative of the energy difference between the frequencies f0+fx and f0−fx before demodulation and is therefore proportional to the attenuation of the amplitude of the spectrum in the band in question. An integrator 41 supplies the coefficient $k_p$ applied to the two filter circuits 20a and 20b from FIG. 6.

The design shown in FIG. 7 is advantageous in that it enables the use of commercially available 90° hybrid couplers operating at a frequency in the baseband followed by simple filters selecting frequency bands whose amplitudes are representative of the tilt. The implementation of the estimator 19 is very simple because it uses only conventional components (hybrid couplers, bandpass and lowpass filters, rectifiers, etc) to correct the amplitude/frequency characteristic of the source signal applied to the input of the transversal filter.

The transversal filter 18 can be different from the embodiment shown, what is essential being that the tilt correction coefficient $k_p$ is applied to a signal allowing for the mutual influence of I on Q and vice versa, i.e. intersymbol interference.

The estimator 19 can also include a summing device 42 supplying |i+j·q|+|q+j·i|, this value being proportional to the amplitude of the baseband signal. A set point gain $C_g$ can also be applied to the summing device 42. Integration of this value by an integrator 43 produces a gain control coefficient $k_g$ applied either to variable gain amplifiers (15 and 16 in FIG. 5) on the input side of the transversal filter (connection shown in dashed line) or constituting the coefficient $k_g$ applied to the multipliers 27, 28 of the transversal filter shown in FIG. 6.

Unlike equalizers operating at the intermediate frequency, the frequency equalizer described so far does not require any modification of the time-delay τ by the time-delay circuits according to the symbol signalling rate and the center frequency of the intermediate signal (or the microwave signal, although in the latter case this is true only to a lesser degree).

Figure 8:
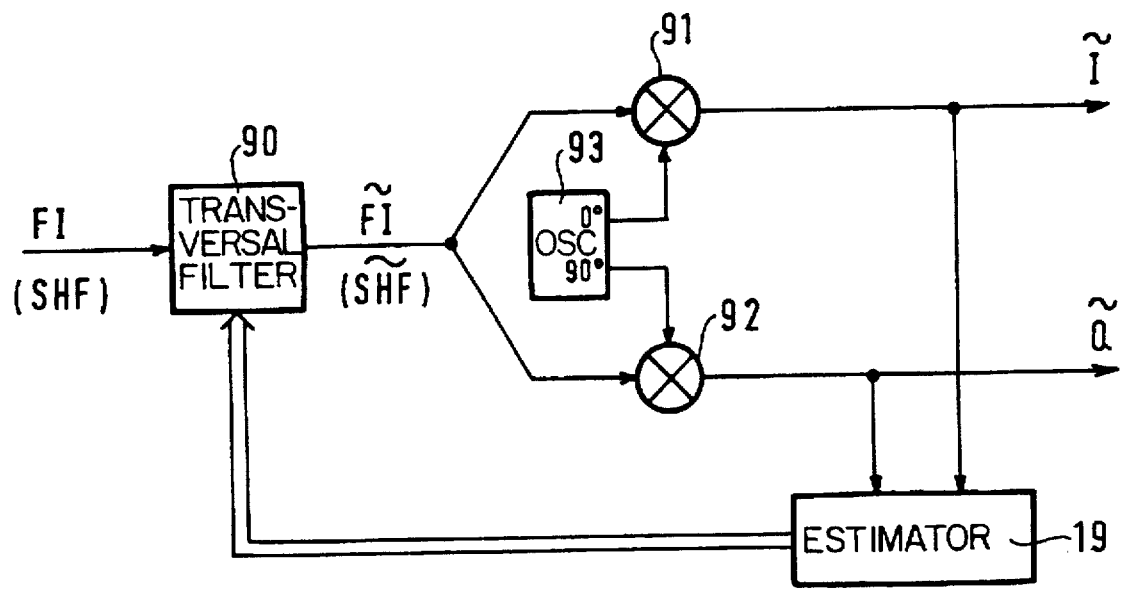
FIGS. 8 and 9 are block diagrams of demodulator stages using the baseband estimator of the invention.

FIG. 8 is a block diagram of a demodulator stage using the baseband estimator 19 of the invention.

The source signal is an intermediate signal FI or a microwave signal SHF. It is applied to the input of an intermediate frequency or microwave transversal filter 90. The output signal of the filter 90 is a microwave corrected signal SHF or an intermediate frequency corrected signal FI. This corrected signal is applied to a demodulator stage including two mixers 91, 92 receiving demodulation signals in phase quadrature from a local oscillator 93. The output signals of the mixers 91, 92 constitute two baseband corrected demodulation components Ĩ and Q̃. These components are applied to the estimator 19 of the invention which generates the coefficient $k_p$ for correcting the tilt of the source signal spectrum. In this application $k_p$ is equal to the difference between |Ĩ+j·Q̃| and |Q̃+j·Ĩ| (i=Ĩ and q=Q̃). The estimator of the invention can therefore also be used to generate a tilt correction coefficient $k_p$ applied to a transversal filter which does not operate in the baseband.

Figure 9:
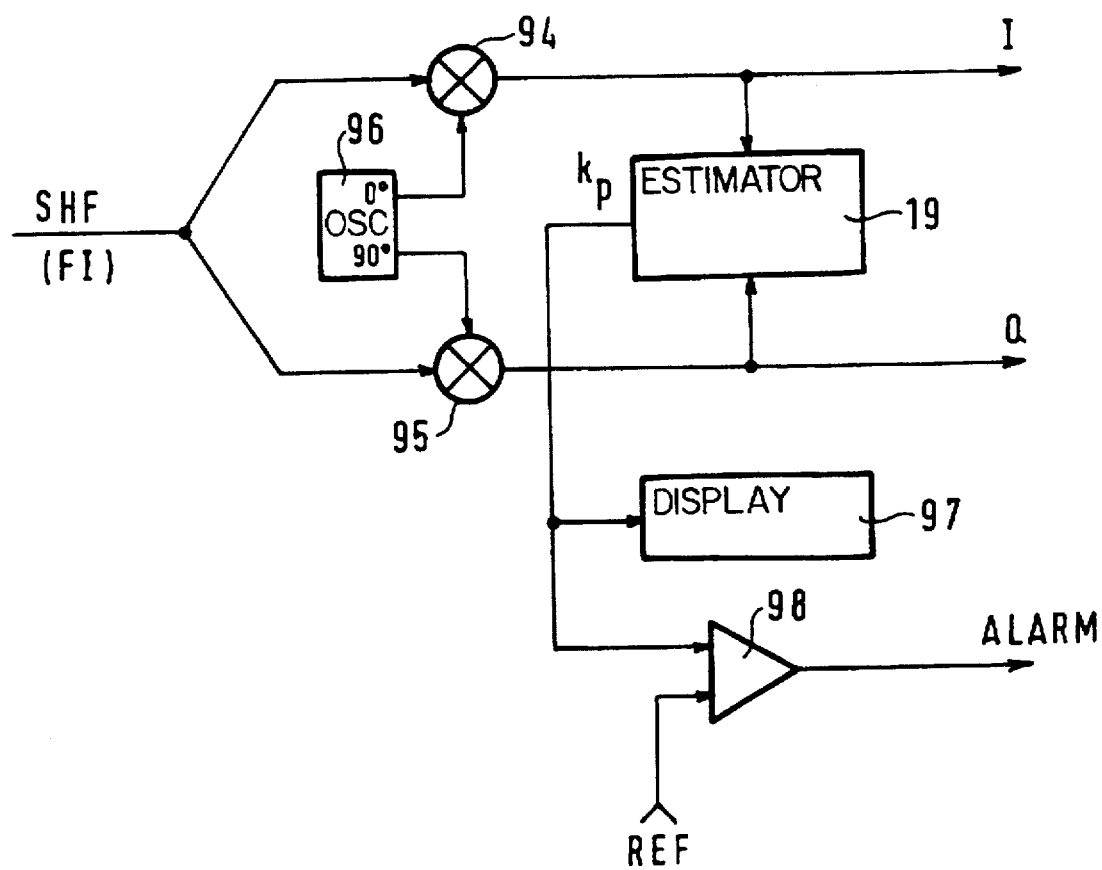

FIG. 9 shows a demodulator stage in which the baseband estimator of the invention is not used to supply a tilt correction coefficient to a transversal filter.

A microwave frequency source signal SHF or an intermediate frequency source signal FI is demodulated by a demodulator stage including two mixers 94, 95 receiving two signals with orthogonal phases from a local oscillator 96. The demodulation components I and Q supplied by the mixers 94, 95 are in the baseband. Direct demodulation is applied if the source signal is the microwave signal SHF and if the local oscillator 96 supplies signals with orthogonal phases whose frequency is equal to the carrier frequency of the signal SHF. The uncorrected components I and Q are applied to the estimator 19 of the invention which generates the coefficient $k_p$.

In two possibly complementary applications the coefficient $k_p$ is supplied to display 97—possibly preceded by a processor—indicating to the user the tilt affecting the received signal SHF and/or to a detector 98 generating an alarm signal (ALARM) if the value $k_p$ goes above a given reference value REF corresponding to a maximal tilt that is not to be exceeded. These uses of the estimator 19 are suitable for transceiver stations in a satellite telecommunication network or a telecommunication network using terrestrial relay stations, for example.

The person skilled in the art will readily conceive of other applications of the estimator of the invention, not necessarily connected with the control of a received signal tilt correction filter.

There is claimed:

1. An estimator for estimating the amplitude/frequency characteristic of a source signal from which baseband components i and q which are applied to the inputs of said estimator are derived by demodulation using two signals having orthogonal phases, said estimator including combining means for generating complex components i+j·q and q+j·i from said components i and q and means for evaluating the relative amplitudes of said complex components in order to produce a coefficient representative of said amplitude/frequency characteristic of said source signal.

2. An estimator according to claim 1 wherein said combining means for combining said components i and q supply said complex components to bandpass filters having center frequencies equal to a given frequency in said baseband.

3. An estimator according to claim 1 wherein said combining means comprise first and second couplers each having a 0° first input and a 90° second input and summing at its output a signal received at its first input and a signal at its second input after the latter is phase-shifted 90° at a given frequency, one of said baseband signals being provided to said first input of said first coupler and said second input of said second coupler, and the other of said baseband signals being provided to the second input of said first coupler and the first input of said second coupler.

4. An estimator according to claim 1 wherein said components i and q are two demodulation components I and Q obtained by demodulating said source signal using two signals having orthogonal phases.

5. An estimator according to claim 1 wherein said coefficient constitutes a correction coefficient for the amplitude/frequency characteristic of a filter input signal, derived from said source signal, applied to the input of a transversal filter to which said correction coefficient is also applied, the output signal of said transversal filter being a corrected signal derived from said filter input signal.

6. An estimator according to claim 5 wherein said corrected signal is a microwave corrected signal or an intermediate frequency corrected signal and a demodulator stage between said transversal filter and said estimator demodulates said corrected signal using two signals having orthogonal phases.

7. An estimator according to claim 5 wherein said corrected signal is a baseband signal made up of two corrected demodulation components and is applied to said estimator inputs, and the input of said transversal filter is coupled to receive as its input signal a signal made up of two baseband components from a demodulator stage receiving said source signal.

8. An estimator according to claim 1 further including summing means for summing |i+j·q| and |q+j·i| to generate an amplitude signal, and means for integrating said amplitude signal to obtain a gain correction coefficient.

9. A transversal filter controlled by an estimator according to claim 1 including:

first and second filter circuits receiving respective first and second demodulation components derived from said source signal and supplying respective first and second sum signals;

summing means for summing said second sum signal with a delayed first demodulation signal from said first filter circuit, said second sum signal having two components symmetrical in time about said first delayed demodulation signal;

subtractor means for subtracting said first sum signal from a delayed second demodulation signal coming from said second filter circuit, said first sum signal having two components symmetrical in time about said delayed second demodulation signal;

said summing means and said subtractor means supplying corrected demodulation components from which the signals at the inputs of said estimator are derived.

10. A transversal filter according to claim 9 wherein a signal applied to the input of said transversal filter is made up of two baseband signals obtained by direct demodulation using two signals having orthogonal phases at a frequency equal to the carrier frequency of a received microwave signal constituting said source signal.

* * * * *